(12) United States Patent
Lowry et al.

(10) Patent No.: US 9,394,757 B2
(45) Date of Patent: Jul. 19, 2016

(54) WELL SEALING VIA THERMITE REACTIONS

(71) Applicant: OLYMPIC RESEARCH, INC., Port Townsend, WA (US)

(72) Inventors: William Edward Lowry, Port Townsend, WA (US); Sandra Dalvit Dunn, Santa Fe, NM (US)

(73) Assignee: Olympic Research, Inc., Port Townsend, WA (US)

( * ) Notice: Subject to any disclaimer, the term of this patent is extended or adjusted under 35 U.S.C. 154(b) by 158 days.

(21) Appl. No.: 14/168,877

(22) Filed: Jan. 30, 2014

(65) Prior Publication Data
US 2015/0211322 A1    Jul. 30, 2015

(51) Int. Cl.
*E21B 33/13* (2006.01)
*E21B 36/00* (2006.01)
*E21B 33/12* (2006.01)

(52) U.S. Cl.
CPC ............. *E21B 33/13* (2013.01); *E21B 33/12* (2013.01); *E21B 36/008* (2013.01)

(58) Field of Classification Search
CPC .................................. E21B 33/12; E21B 33/13
See application file for complete search history.

(56) References Cited

U.S. PATENT DOCUMENTS

| | | | |
|---|---|---|---|
| 3,205,947 A | 9/1965 | Parker | |
| 4,464,989 A | 8/1984 | Gibson et al. | |
| 5,159,983 A | 11/1992 | Barron et al. | |
| 5,564,861 A * | 10/1996 | Khudenko | B09C 1/00 405/128.65 |
| 5,613,557 A | 3/1997 | Blount et al. | |
| 5,698,812 A * | 12/1997 | Song | F42B 12/44 102/283 |
| 5,833,001 A | 11/1998 | Song et al. | |
| 6,102,120 A * | 8/2000 | Chen | E21B 29/10 166/187 |
| 6,474,414 B1 * | 11/2002 | Gonzalez | E21B 33/14 166/192 |
| 6,578,490 B1 * | 6/2003 | Francisco | F42D 1/043 102/275.11 |
| 6,805,832 B2 | 10/2004 | Mohler et al. | |

(Continued)

FOREIGN PATENT DOCUMENTS

| | | |
|---|---|---|
| WO | 2006137920 | 12/2006 |
| WO | 2013/133583 | 9/2013 |
| WO | 2013135583 | 9/2013 |

OTHER PUBLICATIONS

U.S. Appl. No. 14/168,863, William E. Lowry.

(Continued)

*Primary Examiner* — Zakiya W Bates
*Assistant Examiner* — Crystal J Miller
(74) *Attorney, Agent, or Firm* — McDonnell Boehnen Hulbert & Berghoff LLP

(57) ABSTRACT

Wells are sealed by means of thermite reaction charges inserted into the wells. The reaction charge can be diluted by addition of metal oxides, silica, or the like control reaction pressure, peak temperature, reaction rate, and expansion characteristics of the resulting thermite plug. The use of dilution of the thermite reactants can take the form of a thermite charge with specific layers, including relatively high and low reaction temperature layers. The ignition source can be oriented to achieve directional control on the product expansion including radial or axial expansion. The charge can be loaded with a large mass to compress the resulting thermite plug into the borehole wall and reduce its porosity during the reaction process. A further variation involves continuous feed of the thermite reactants to the reaction zone. Various combinations and permutations of the above inventive concepts are described.

4 Claims, 7 Drawing Sheets

(56) References Cited

U.S. PATENT DOCUMENTS

| | | | |
|---|---|---|---|
| 6,923,263 B2 | 8/2005 | Eden et al. | |
| 6,925,937 B2 | 8/2005 | Robertson | |
| 7,363,860 B2* | 4/2008 | Wilson | F42B 3/02 102/205 |
| 7,555,986 B2* | 7/2009 | Givens | C06B 33/00 102/293 |
| 7,829,157 B2* | 11/2010 | Johnson | B23K 23/00 427/404 |
| 8,196,515 B2* | 6/2012 | Streibich | C06B 33/02 102/531 |
| 8,256,521 B2* | 9/2012 | Swor | E21B 23/06 166/376 |
| 8,291,970 B2* | 10/2012 | Swor | E21B 23/06 166/118 |
| 8,381,652 B2* | 2/2013 | Glenn | F42B 1/028 102/306 |
| 8,474,381 B2* | 7/2013 | Streibich | C06B 33/02 102/531 |
| 8,685,187 B2* | 4/2014 | Han | F42B 1/02 149/108.2 |
| 8,701,767 B2* | 4/2014 | Andrzejak | C06B 33/08 102/306 |
| 8,864,924 B2* | 10/2014 | Coffey | C06B 33/12 149/37 |
| 2003/0145924 A1* | 8/2003 | Carter, Jr. | C06B 33/12 149/37 |
| 2006/0144591 A1* | 7/2006 | Gonzalez | E21B 29/10 166/277 |
| 2006/0266204 A1* | 11/2006 | Givens | C06B 33/00 89/1.14 |
| 2008/0047449 A1* | 2/2008 | Wilson | F42B 3/02 102/205 |
| 2008/0224413 A1* | 9/2008 | Doane | E21B 33/1208 277/323 |
| 2010/0108253 A1* | 5/2010 | Doane | E21B 33/1208 156/275.7 |
| 2010/0108308 A1* | 5/2010 | Doane | E21B 33/1208 166/179 |
| 2010/0119728 A1* | 5/2010 | Johnson | B23K 23/00 427/535 |
| 2010/0252022 A1* | 10/2010 | Coffey | F24J 1/00 126/263.01 |
| 2011/0132223 A1* | 6/2011 | Streibich | C06B 33/02 102/531 |
| 2011/0146519 A1 | 6/2011 | Han et al. | |
| 2012/0160492 A1* | 6/2012 | Andrzejak | C06B 33/08 166/297 |
| 2012/0216701 A1* | 8/2012 | Streibich | C06B 33/02 102/531 |
| 2012/0255742 A1 | 10/2012 | Cortez | |
| 2014/0251612 A1* | 9/2014 | Powers | E21B 33/1208 166/281 |

OTHER PUBLICATIONS

U.S. Appl. No. 14/168,867, William E. Lowry.

U.S. Appl. No. 14/168,868, William E. Lowry.

Wang et al., Thermite reactions: their utilization for synthesis and processing of materials, J. Materials Science 28 (1993) pp. 3693-3708.

Fisher et al., A survey of combustible metals, thermites and intermetallics for pyrotechnic applications, presented at the 32nd AIAA/ASME/SE/ASEE Joint Propulsion Conference, Lake Buena Vista, FL, Jul. 1-3, 1996.

Orru et al., Self-propagating thermite reactions: effect of alumina and silica in the starting mixture on the structure of the final products, Metallurgical Science and Technology 15 (1)(1997) pp. 31-38.

Notification of Transmittal of The International Search Report and The Written Opinion of the International Searching Authority or The Declaration, International Application No. PCT/US2014/061289, mailed Feb. 5, 2015.

* cited by examiner

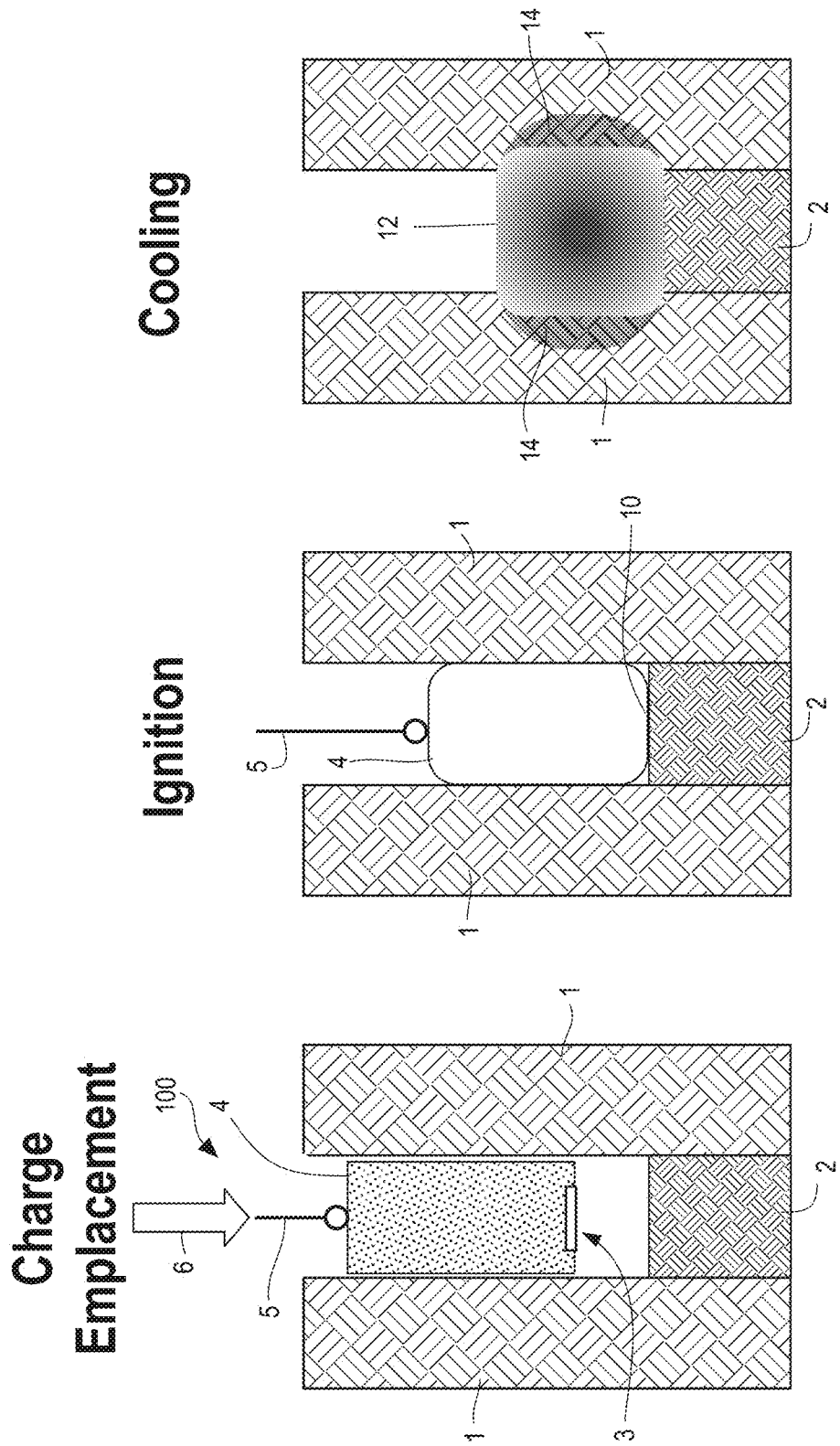

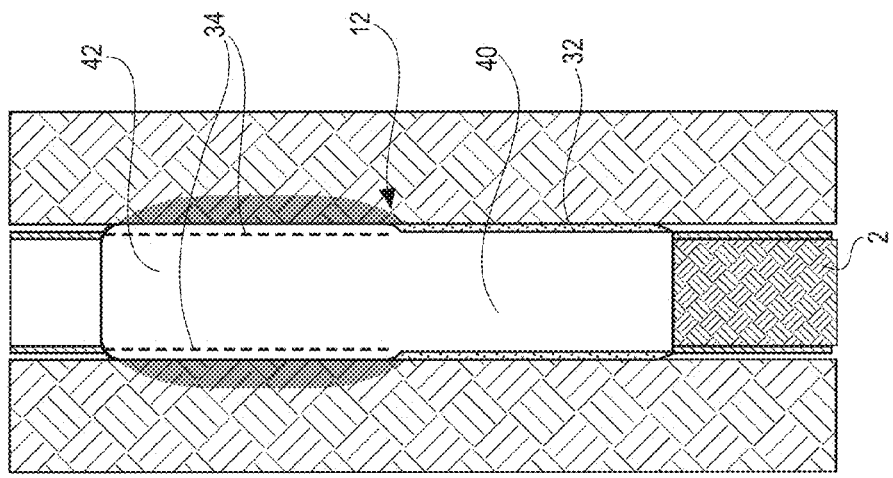
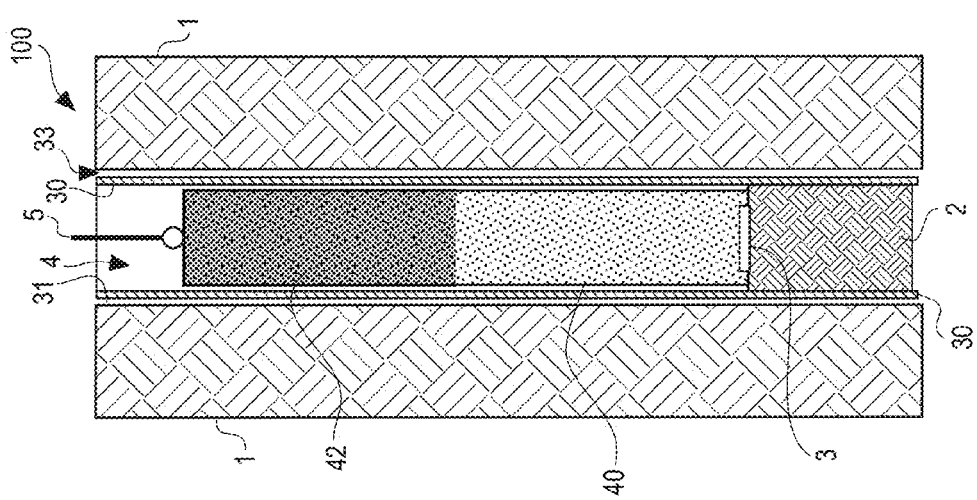
Fig. 3A
Fig. 3B

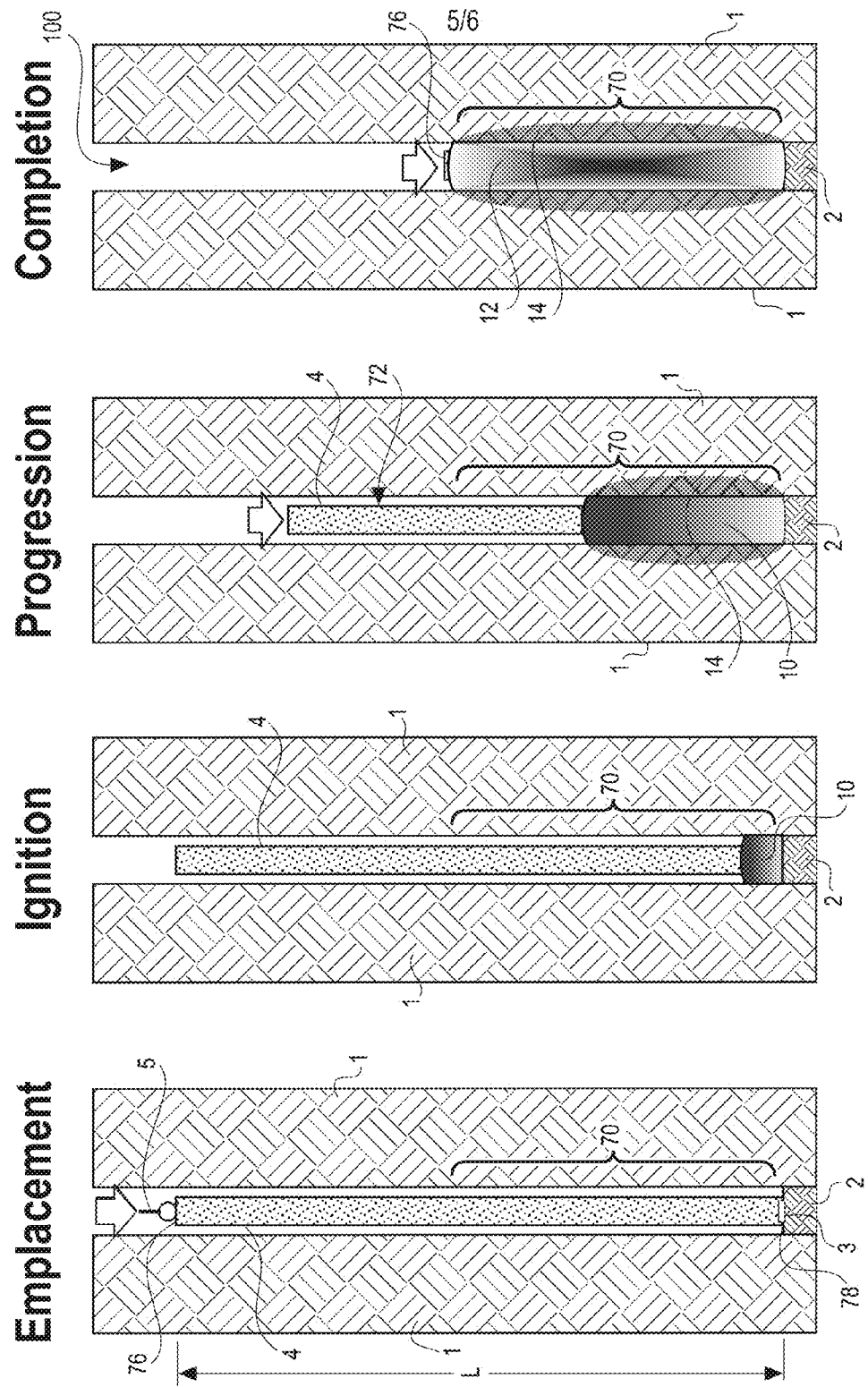

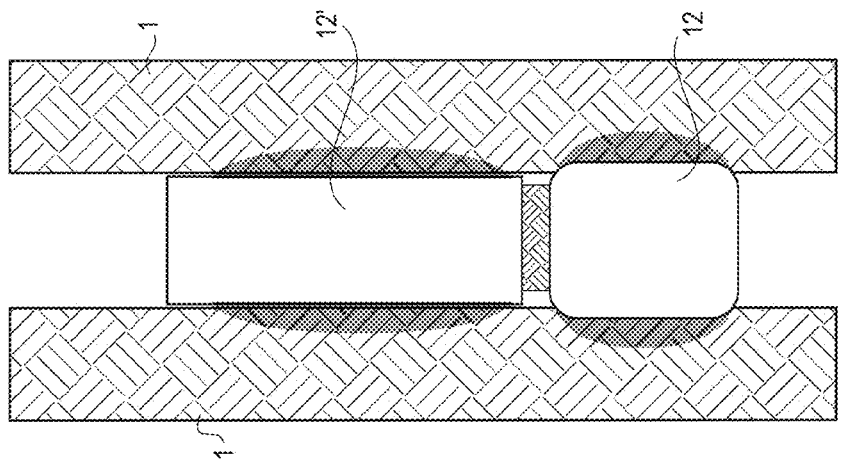
Fig. 7C Main Charge Formation
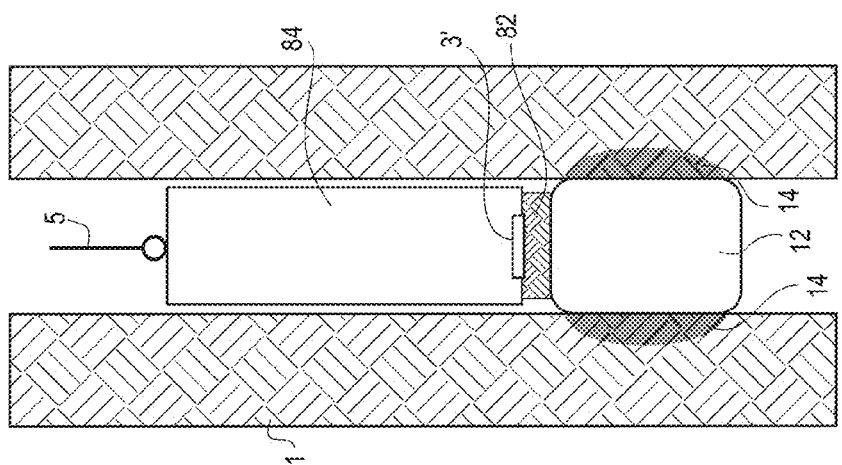
Fig. 7B Platform Formation
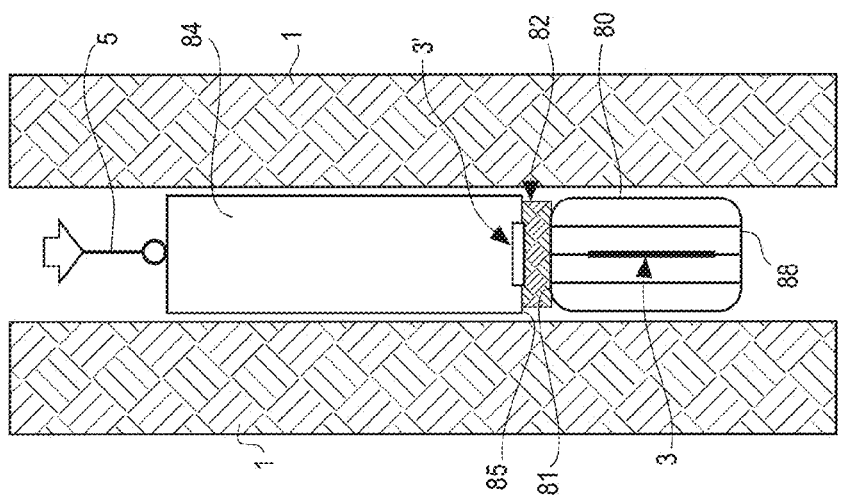
Fig. 7A Emplacement

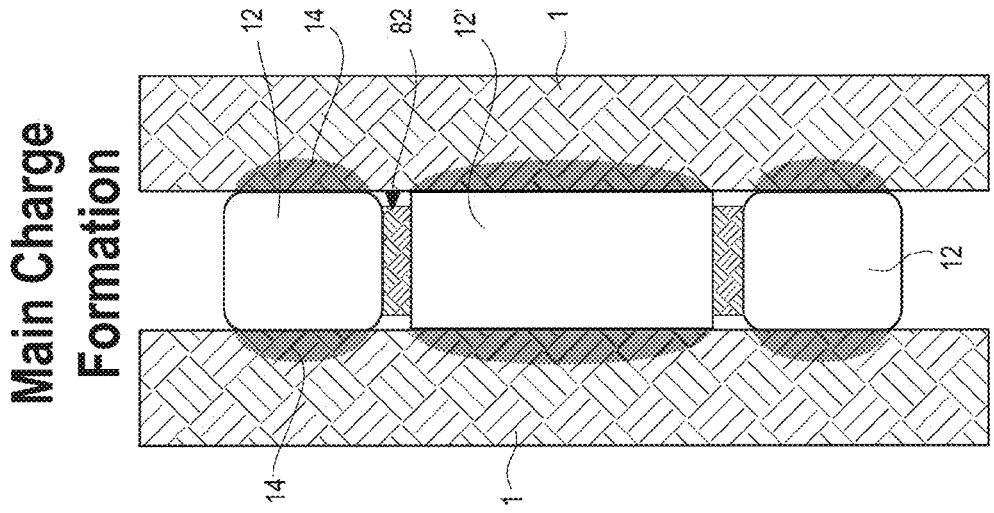
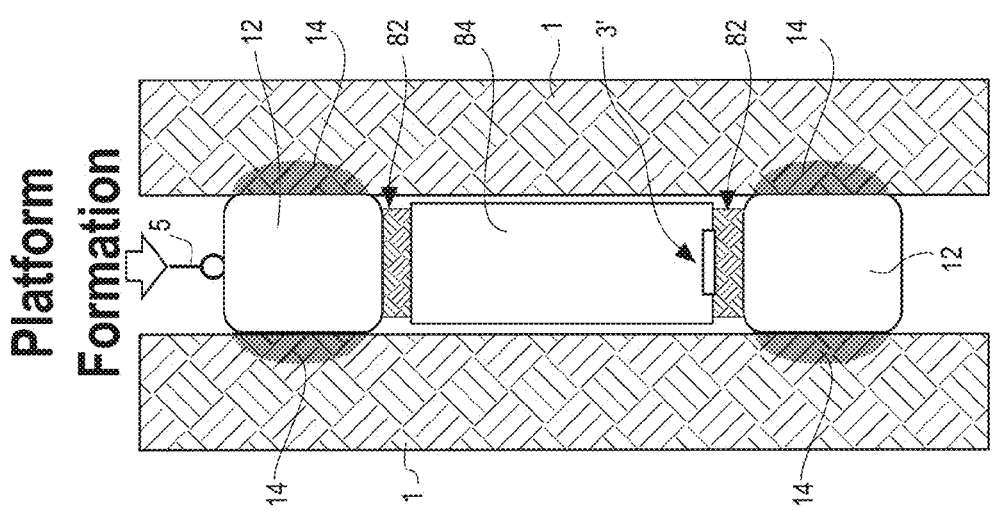
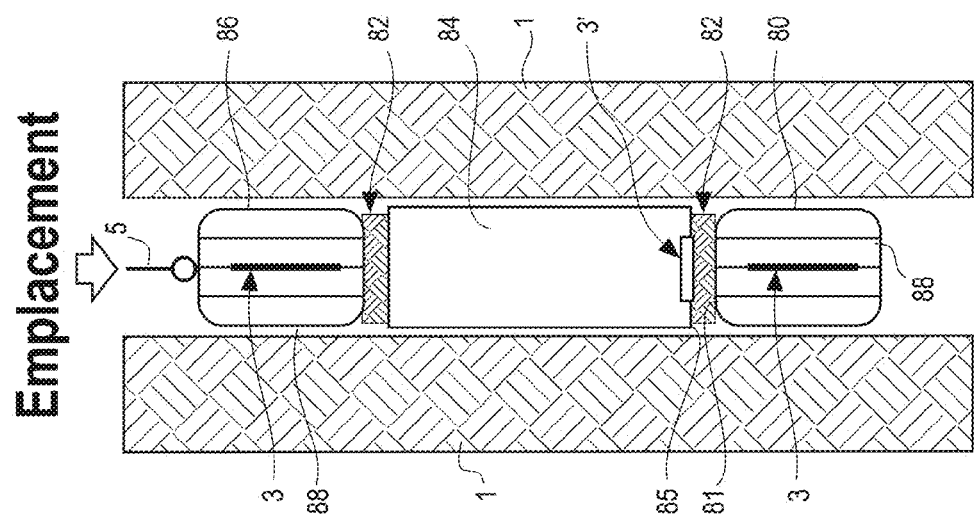
Fig. 8C — Main Charge Formation
Fig. 8B — Platform Formation
Fig. 8A — Emplacement

WELL SEALING VIA THERMITE REACTIONS

CROSS REFERENCE TO RELATED APPLICATIONS

This application is related to three other applications filed on the same date (Jan. 30, 2014) by the same inventors and having the same title, U.S. Ser. Nos. 14/168,863, 14/168,867 and 14/168,868.

BACKGROUND

This invention relates to methods for sealing a well using a thermite reaction charge placed or lowered into the well. The invention has remedial and sealing applications for wells used in oil and natural gas production, as well as in other applications including sealing of wells used for underground storage of nuclear waste, sequestration of $CO_2$, and the like.

As used in this document, the term "thermite reaction" is intended to refer to a broad class of chemical reactions which can be defined as an exothermic reaction which involves a metal reacting with a metallic or a non-metallic oxide to form a more stable oxide and the corresponding metal or non-metal of the reactant oxide. This is a form of oxidation-reduction reaction which can be written in a general form as:

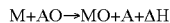

$$M+AO \rightarrow MO+A+\Delta H$$

where M is a metal or an alloy (typically, but not necessarily Aluminum) and A is either a metal or a non-metal, MO and AO are their corresponding oxides, and $\Delta H$ is the heat generated by the reaction. Commonly, AO is one of the species of Iron Oxide, such as $Fe_2O_3$ or $Fe_3O_4$. A typical thermite reaction is of the form $2Al+Fe_2O_3 \rightarrow 2 Fe+Al_2O_3$. The reaction produces a great deal of heat per unit of mass, and can attain a reaction temperature of approximately 3,000° C.

Thermite reactions have many uses, including welding, pyrotechnics, synthesis and processing of materials, and military applications. Background information on thermite reactions is described in the review article of Wang et al., *Thermite reactions: their utilization for synthesis and processing of materials*, J. Materials Science 28 (1993) pp. 3693-3708; and in Fisher et al., *A survey of combustible metals, thermites and intermetallics for pyrotechnic applications*, presented at the 32$^{nd}$ AIAA/ASME/SE/ASEE Joint Propulsion Conference, Lake Buena Vista, Fla., Jul. 1-3 1996. Additional background information is found in Orru et al., *Self-propagating thermite reactions: effect of alumina and silica in the starting mixture on the structure of the final products*, Metallurgical Science and Technology 15 (1)(1997) pp. 31-38. The entire content of the Wang et al., Fisher et al. and Orru et al. articles is incorporated by reference herein.

Thermite reactions have also been proposed for well sealing application, see published PCT application WO 2013/133583 and US patent application publication 2006/0144591. See also U.S. Pat. No. 6,923,263. Thermites have been applied in the drilling industry for blowout prevention (U.S. Pat. No. 5,159,983), explosive sealing of casing perforations (U.S. Pat. No. 5,613,557), gas generation for downhole tool actuation (U.S. Pat. No. 6,925,937), well perforation and hydrofracturing (US patent application publication 2011/0146519) and downhole bonding of metal members (US patent application publication 2012/0255742). Many other patents exist for welding and demolition with thermite in above ground applications, but these are not considered relevant to borehole seal applications.

The basic concept of emplacing thermite charges into a well to perform sealing and structural roles is depicted in FIGS. 1A-1C. Referring to FIG. 1A, a well 100 (shown in cross-section) defined by the inner walls of a formation 1 has a platform 2 in the form of a backfill or bridge plug inserted into the well. A thermite charge 4, typically a compressed block consisting of a mixture of a metal fuel material (such as aluminum powder) and a metal oxide (such as iron oxide powder) is lowered to a position in the well with some form of rigid platform 2 (such as a bridge plug) supporting it. The platform 2 can be either granular backfill material, cement, or a mechanical plug (bridge plug) protected by an insulating material (not shown) on its upper surface. The thermite charge 4 is then ignited by an electrical means, shown as igniter 3. The igniter can be located on the bottom, in the interior, or on the top of the thermite charge. As shown in FIG. 1B, after the igniter 3 is activated, the thermite charge 4 burns in place as a self-sustaining exothermic reaction. The burning occurs in a reaction zone 10 which propagates upward through the thermite charge 4. As shown in FIG. 1C, after the burning is complete the thermite charge forms a rigid hot plug 12 of a metal and oxide, ceramic-like material. The heat of the reaction may melt into the borehole wall material as shown at 14 in FIG. 1C, or melt through the steel well casing if one is present, to form a platform or sealing component.

SUMMARY

Improvements to the plug and emplacement design of FIG. 1 are described which allow tailoring the well sealing method to achieve specific performance objectives and improve the sealing characteristics of the resulting plug. These include dilution of the thermite reactants to control reaction pressure, peak temperature, reaction rate, and expansion characteristics of the resulting thermite plug. The use of dilution of the thermite reactants to form a thermite charge with specific layers, including relatively high and low reaction temperature layers, is also described. We also describe including additives to the reactant mixture to alter the melt properties, such as eutectic materials or low melting point oxides which will alter the viscosity of the product liquid phase. Additional variations are described including orientation of the ignition source to achieve directional control on the product expansion, loading the plug with a large mass to compress the material into the borehole wall and reduce its porosity during the reaction process. A further variation involves continuous feed of the thermite reactants to the reaction zone. Various combinations and permutations of the above inventive concepts into specific well sealing applications are described in particular detail below.

It will be noted that many metal/oxide thermite formulations are available to achieve specific objectives. The basic aluminum/iron oxide formulation is described here for purposes of example and not limitation, it being understood that other formulations may be suitable for specific applications.

BRIEF DESCRIPTION OF THE FIGURES

FIGS. 1A-1C illustrate charge placement, ignition and cooling phases for a prior art thermite plug emplacement and reaction well sealing method.

FIGS. 2A-2C are an illustration of a hot compaction embodiment for well sealing using a thermite reaction, in which FIG. 2A depicts charge placement, FIG. 2B depicts the ignition of the thermite charge and FIG. 2C depicts the cooling and mass removal phases of the method.

FIGS. 3A-3B are an illustration of a casing heating/swaging embodiment for well sealing where a well casing is present within the well, with FIG. 3A showing a thermite charge having two layers (lower relatively low temperature thermite layer and upper relatively high temperature thermite layer) being placed in the well, and FIG. 3B showing the plug formed in the well after the ignition of both layers of the thermite charge.

FIGS. 6A-6D are an illustration of an embodiment with continuous feed of thermite into a reaction zone, with FIG. 6A showing an emplacement phase, FIG. 6B showing an ignition phase, FIG. 6C showing a progression of the reaction zone with continuous feed of the thermite charge into the reaction zone, and FIG. 6D showing the completion of the reaction phase and formation of a plug within the well.

FIGS. 7A-7C are an illustration of an embodiment in which a relatively lower temperature expansive thermite charge is ignited and then a relatively higher temperature thermite charge is ignited above the lower temperature thermite charge. FIG. 7A shows the emplacement phase, FIG. 7B shows the platform formation phase in which the lower temperature thermite charge is ignited, and FIG. 7C shows the main (relatively higher temperature) charge ignition.

FIGS. 8A-8C show a similar embodiment to FIGS. 7A-7C, with an additional relatively lower temperature thermite charge located above the main higher temperature charge. FIG. 8A shows the emplacement phase, FIG. 8B shows the two lower temperature thermite charges after ignition, and FIG. 8C shows the main (relatively higher) charge after ignition. Both the lower and upper low temperature thermite charges are reacted and allowed to cool sufficiently to support and confine the higher temperature main charge as shown in the sequence FIGS. 8A to 8C.

DETAILED DESCRIPTION

First Embodiment

Applying Compressive Vertical Load to Thermite Plug by Loading with a Weight on Top to Reduce Product Porosity and Force it into Well Surface Irregularities. (FIGS. 2A-2C)

In an unpressurized thermite reaction, the product (e.g., plug 12 of FIG. 1C) is a porous matrix of metal oxide and metal. The porosity results from entrained voids due to the charge preparation process, in which some porosity remains because the powders cannot be compacted to their maximum density, and other porosity is generated by entrained bubbles of the very small amount of gases generated in the reaction. The porosity of the final plug material reduces its potential strength and causes it to be permeable to fluid flow.

To reduce the porosity, we have demonstrated that by loading the top of the thermite charge during ignition and burning with a static mass (such as a solid steel cylinder having a mass, for example of between 500 kg-1,500 kg, or other heavy object of roughly similar density) it will 'hot press' the plug formed during the reaction process, reduce its porosity, and press the thermite reaction material more firmly into the surrounding medium. To further reduce porosity of the final product, lower melting point oxides or eutectic materials (such as calcium oxide) can be added to the thermite reactants in the thermite charge to reduce the product melt temperature and maintain it in liquid form for a longer duration. Of course, the exact weight of the static mass that is optimal may depend on particular applications, such as for example the size of the well bore, the length of the desired plug sealing zone, the mixture used in the thermite reaction charge, and other factors.

Figure 2C:
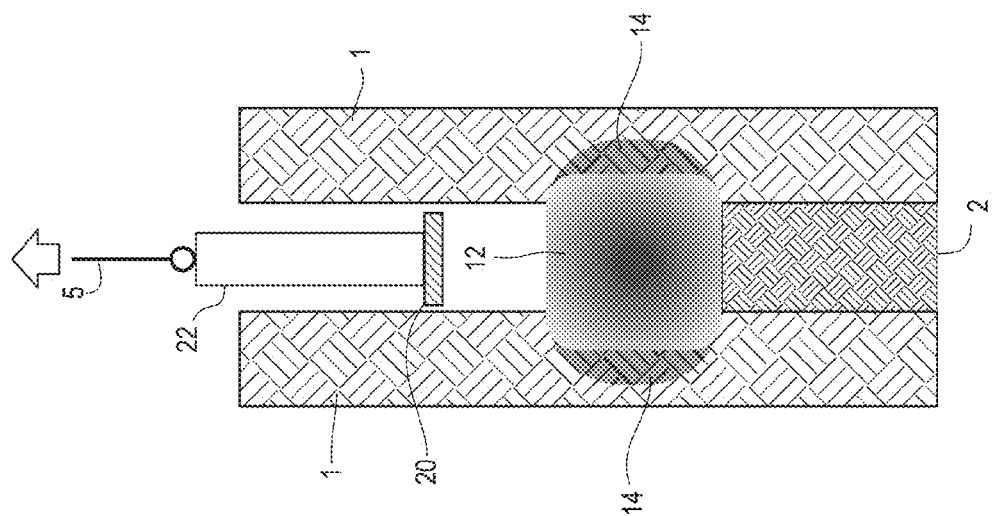
Figure 2B:
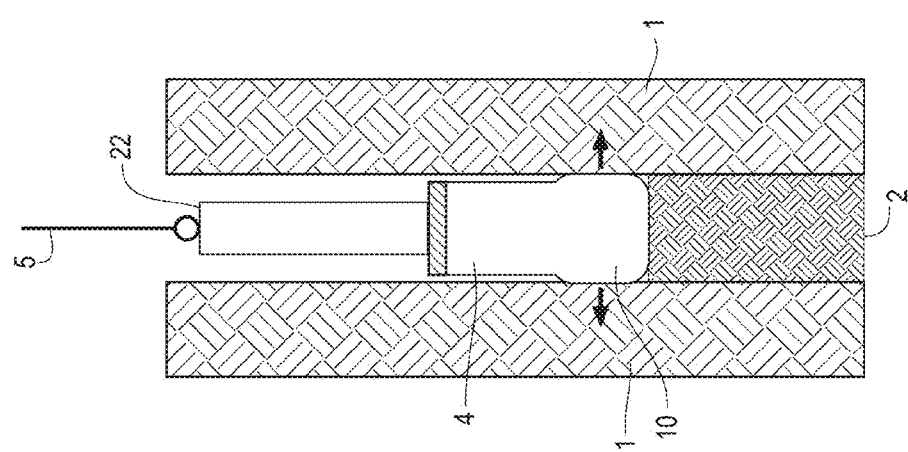
Figure 2A:
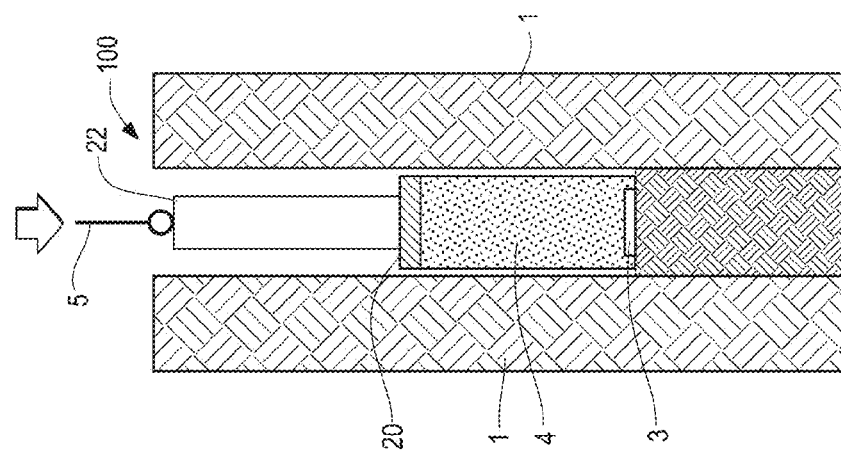

This embodiment is shown in FIGS. 2A-2C. In FIG. 2A, a well sealing apparatus is shown in the form of a thermite reaction charge 4 having a cylindrical body sized to fit within a well 100, an igniter 3 for the thermite reaction charge 4, and a heavy mass 22 in the form of a solid steel cylinder or the like applying a massive load by means of gravity to the thermite reaction charge 4. The thermite reaction charge 4 is separated from the heavy mass 22 by means of a separator 20, which may take the form of an insulator of any suitable material. A means 5, such as a wireline, drill pipe, or any other conventional apparatus known in the art is used for raising and lowering objects into the well. The means 5, e.g., wireline, is connected to the heavy mass 22 and lowers the heavy mass 22, thermite reaction charge 4, separator (insulator) 20 and igniter 3 as a unit into the well. Alternatively, the heavy mass can be lowered after the thermite reaction charge has been placed into the well at the desired location.

The igniter 3 may be of electrical in nature and a wire for the igniter is not shown, it being understood that any suitable chemical, electrical or pyrotechnic igniter could be used. The details of the igniter are well known by persons skilled in the art, and are not particularly important. The separator 20 allows the means 5 for raising and lowering to remove the heavy mass 22 from the well after ignition and burning of the thermite reaction charge within the well as shown in FIG. 3. In FIG. 2A, the bore of the well 100 is plugged with a suitable bridge plug 2 which could be made of concrete, aggregate, or other material so that when the thermite reaction charge 4 is lowered into the well it rests on the plug 2 and the full weight of the heavy mass 22 is applied directly to the thermite reaction charge 4.

The method for sealing the well in FIGS. 2A-2C is as follows. First, a thermite reaction charge 4 is lowered into the well at a location where the well is to be sealed. A lower support (e.g., backfill or a bridge plug platform 2) for the thermite reaction charge is provided at the location, and the platform 2 can be lowered or otherwise formed in the well prior to lowering the thermite reaction charge; alternatively the bridge plug can be included as part of the thermite reaction charge assembly lowered into the well and formed in-situ, for example using the techniques of FIGS. 7A-7C and described subsequently.

The method continues with applying a heavy mass load to the thermite reaction charge at the location, as shown in FIGS. 2A and 2B by means of the massive cylinder 22 resting on the thermite reaction charge 4 while it is supported from below.

The method continues with a step of igniting the thermite reaction charge 4 and conducting a thermite reaction in the thermite reaction charge while the heavy mass load is applied to the thermite reaction charge, as shown in FIG. 2B. The thermite reaction forms a plug which expands outwardly under load pressure from the heavy mass as the reaction occurs. This outward expansion is indicated by the arrows in FIG. 2B. The reaction continues until all the fuel in the thermite charge is exhausted, all the while the load from the heavy mass is applied to the thermite reaction charge 4. As shown in FIG. 2C, the resulting plug 12 is formed in the well, with the plug sufficiently hot that it melts portions of the surrounding formation 1 as indicated by 14, resulting in the plug 12 sealing the well. The means for raising and lowering 5 is then activated to raise the heavy mass 22 (and any remnants of the separator 20) from the location where the plug 12 is formed.

The addition of a diluent to the thermite charge 4, such as metal oxides or eutectic materials, is optionally performed so as to lower the melting point of the plug 12 and prolong the time when the plug 12 is in a liquid or viscous state. This assists in insuring that the plug 12 is pressed firmly into the surrounding formation 1. Furthermore, the compressive load from the heavy mass 22 during burning of the thermite charge 4 reduces the porosity of the plug 12 and helps ensure against escape of gasses or other material from the well below the location of the plug 12.

Second Embodiment

Diluting the Stoichiometric Thermite Metal Fuel/Oxide Mix to Achieve Specific Design Objectives, Including Layered Thermite Charges. (FIGS. 3A-3B)

The stoichiometric mixture of red iron oxide ($Fe_2O_3$) and aluminum powder is approximately 3:1 by mass, respectively. In this mix ratio, under atmospheric conditions, the reaction is relatively fast, violent, and difficult to contain. It produces a large amount of thermal energy and reaches peak temperatures of nearly 3000° C., hence its use in field welding and demolition.

For the purpose of sealing a well, however, the reaction must be controlled in order to contain the reaction products and form a monolithic plug material. Diluents and/or additives to the base mixture can be used to control the burn rate, peak temperature, and mechanical properties of the final plug. For instance, diluting the aluminum/iron oxide thermite formula with aluminum oxide (which is also a product of the reaction), moderates the reaction, and slows the reaction down to a rate that allows total containment of the thermite reaction with very little (gas) pressure generation. While stoichiometric aluminum/iron oxide thermite reaches a nominal peak temperature of 2965° C., by adding to the original mixture mass an additional 75% by mass aluminum oxide powder, the peak reaction temperature can be controlled to less than 1700° C. and still sustain combustion. Dilutions greater than this percentage cannot sustain the thermite reaction, hence 75% by mass is considered an upper practical limit to the amount of dilution. The diluted thermite reaction charge results in a slow, controlled reaction velocity, as low as 0.1 cm/sec, as compared to the raw/undiluted thermite mixture burn velocity of 10 to 100 cm/sec. We have appreciated that slow, controlled thermite reactions resulting from dilution of the thermite reaction charge at lower temperatures are desirable for well sealing applications, and can be adapted into various thermite reaction charge designs for well sealing. A burn velocity of approximately 1 cm/sec is considered suitable for some applications in well sealing.

In one example, this dilution feature enables design of a thermite plug with a relatively cooler lower section that reacts first and heats up the well casing to a plastic but not molten state. The lower, cooler plug can be designed such that it will expand radially and will swage the well casing outward to thereby fill the annular gap between the casing and the borehole/formation wall. Then, in a second phase of the thermite reaction, an upper, relatively hotter thermite reaction charge ignites and melts through the casing and into the rock/formation wall. The cooler lower section prevents the molten material from the relatively hotter upper plug section from flowing or falling down into the annular void between the well casing and the formation wall, which would negate its sealing role.

An example of this embodiment is shown in FIGS. 3A and 3B. FIG. 3A shows a well 100 having a casing 30 separated from a borehole wall 31 in a formation 1, with an annular gap 33 separating the borehole wall 31 and the casing 30. A plug or platform 2 is placed in the well at the location where the well is to be sealed. A thermite reaction charge 4 is lowered into the well, e.g. by means of the wireline or drill pipe 5 and placed on the upper surface of the platform 2.

The thermite reaction charge 4 includes at least two layers of thermite reaction charge including a first relatively lower reaction temperature layer 40 and a second relatively higher reaction temperature layer 42. The first layer 40 is in the form of a thermite reaction material, e.g., powdered mixture of aluminum and iron oxide, which has been diluted by addition of one or more additives, e.g., aluminum oxide, to moderate an exothermic reaction produced by the thermite reaction material 40 when it is ignited. The moderating of the exothermic reaction is designed to lower the reaction temperature and reaction velocity within the thermite reaction material in the layer 40 from what they would otherwise be without the one or more additives. In this example, the purpose of the moderation is to heat the well casing 30 to a plastic temperature such that radial expansion of the thermite charge during burning causes the casing 30 to expand radially and essentially swage against the rock formation 1 and close the annular gap 31. This is shown in FIG. 3B. After ignition (by means of the igniter 3 at the lower end of the layer 40), the thermite reaction progresses upwardly within the layer 40 and the charge in the layer 40 expands radially outwardly to progressively swage the casing 30 against the rock wall in the formation 1, as shown at 32 in FIG. 3B.

When the thermite reaction has progressed to the top of the lower layer 40, the upper layer 42 of relatively higher reaction temperature thermite charge (for example undiluted aluminum and iron oxide powder) is ignited and the upper layer burns at a hotter temperature so as to melt the casing as indicated at 34 in FIG. 3B and the adjacent region of the rock formation 1.

Accordingly, in a first aspect of this embodiment, a method of sealing a well is disclosed, comprising the steps of: lowering a thermite reaction charge 40 into the well at a location where the well is to be sealed, wherein the thermite reaction charge 40 lowered into the well has been diluted by addition of one or more additives to moderate an exothermic reaction produced by the thermite reaction charge when ignited, i.e., substantially lowering the reaction temperature and reaction velocity within the thermite reaction charge from what they would otherwise be without the one or more additives to meet a specific design objective for the sealing of the well; and igniting the thermite reaction charge (by means of igniter 3), the thermite reaction charge burning so as to form a plug in the well.

In this embodiment, the one or more additives/diluents may take the form of a metal oxide. Other additives could be used, for example as described in the article of Orru et al. cited in the Background section of this document. The thermite reaction charge is preferably diluted by an amount of between 5 and 75 percent by mass. For example, the thermite reaction charge is diluted by addition of aluminum oxide by up to 75 percent and the reaction velocity of the thermite material is reduced to at or below 1 cm/second.

In another aspect, a method of sealing a well has been described, comprising the steps of: a) lowering a thermite reaction charge into the well at a location where the well is to be sealed (FIG. 3A), the thermite reaction charge comprising at least two layers of thermite reaction charge including a first relatively lower reaction temperature layer 40 and a second relatively higher reaction temperature layer 42, b) wherein the first layer 40 comprises a thermite reaction material which has been diluted by addition of one or more additives to moderate an exothermic reaction produced by the thermite reaction material when ignited, the moderating comprising lowering the reaction temperature and reaction velocity within the thermite reaction material from what they would otherwise be without the one or more additives; and c) igniting the first and second layers of the thermite reaction charge. It will be noted that in the example of FIG. 3A, the first layer 40 is ignited by an igniter 3 installed in the thermite reaction charge specifically for this purpose, and the second layer 42 is ignited by the burning of the first layer reaching the lower edge of the second layer.

This method can include the step of placing a platform (2, FIG. 3A) into the well below or at the location where the well is to be sealed and placing the thermite reaction charge 40/42 onto the platform. As shown in FIG. 3A, the first layer 40 is positioned below the second layer 42, and the second layer 42 is ignited after the first layer 40 is ignited.

In this method, the well may further include a casing (30), and ignition of the first layer 40 causes the casing 30 to be swaged outwardly into contact with a formation 1 surrounding the casing 30.

In yet another aspect, a method of sealing a well is disclosed, the well having a casing 30 and a borehole wall 31, the casing separated from the borehole wall 31 by an annular gap 33 comprising the steps of: a) forming a swage at a first location in the well by igniting a diluted thermite material (layer 40) lowered into the well proximate the first location so as cause the casing to heat to a plastic but not molten state and expand the plastic casing 30 against the borehole wall 31 and thereby close the annular gap 33 (see FIG. 3A), and b) igniting a second thermite material 42 above the first location to melt the casing and surrounding borehole wall and form a plug in the well, as shown in FIG. 3B.

In still another aspect, a well sealing apparatus has been described in FIG. 3A including a) a thermite reaction charge 40/42 having a cylindrical body sized to fit within a well, the thermite reaction charge including a first relatively lower reaction temperature layer 40 and a second relatively higher reaction temperature layer 42; and b) an igniter 3 for the relatively lower reaction temperature layer. The apparatus may further include a plug or platform 2 placed in the well below the thermite reaction charge. As shown in FIG. 3A, the first relatively lower reaction temperature layer 40 is positioned below the second relatively higher reaction temperature layer 42.

A further example of this embodiment showing two thermite reaction charges with different reaction temperatures, separated by an insulating layer, is illustrated in FIGS. 7A-7C and will be described subsequently.

A further example of this embodiment showing the main high temperature thermite charge confined by one low temperature expanding charge below, and another low temperature expanding charge above the main charge, is illustrated in FIGS. 8A-8C and will be described subsequently.

A further example of this embodiment is to load the upper high temperature plug 42 with a heavy mass to compress the reacted charge, reduce its porosity, and press the reaction products into the borehole wall, in accordance with the teachings of FIGS. 2A-2C.

Third Embodiment

Designing the Thermite Ignition Geometry to Achieve Thermite Product Expansion in a Desired Direction. (FIGS. 4, 5, 7A-7B, 8A-8B)

Tests of diluted thermite mixtures have shown that, when unconstrained, the thermite expands in the direction of reaction propagation. For example, as shown in FIG. 4, a cylindrical plug of thermite 4 ignited at its lower end by means of an igniter 3 will expand in the vertical direction along the axis $\alpha$ of the plug 4 and increase in length by as much as 10-20%, with very little increase in diameter since the reaction occurs as a planar front proceeding along the axis of the cylinder.

Figure 5:
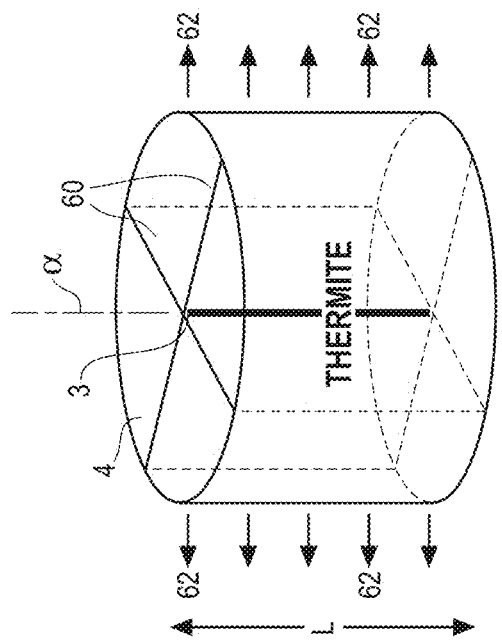
FIG. 5 is a schematic illustration of a thermite cylinder showing an ignition source located on the centerline (axis) of the thermite cylinder and resulting radial direction of expansion. The cylinder of FIG. 5 has pre-established cleavage planes formed in the thermite cylinder to foster the radial expansion.

We have appreciated that for well sealing applications it is desirable to have the thermite expand radially outward. To achieve this, the cylindrical plug of thermite 4 is ignited by a hot wire (or other suitable igniter 3) running essentially along the center axis $\alpha$ of the thermite plug 4 as shown in FIG. 5. With this design, the reaction proceeds radially from the centerline of the thermite plug 4 and increases the diameter of the cylinder, not its length. For the plug to expand radially, slippage/cleavage planes 60 (i.e., cuts) are formed in the thermite material prior to combustion (i.e., at the time of manufacture or assembly of the thermite charge) to allow for radial expansion as indicated at 62, since the compacted thermite has sufficient tensile strength to counteract radial expansion without slippage/cleavage planes. The cleavage/slippage planes are formed in any suitable manner in the thermite material, such as by means of a slitting saw, or preforming the thermite charge in pieces to produce the desired configuration.

Figure 4:
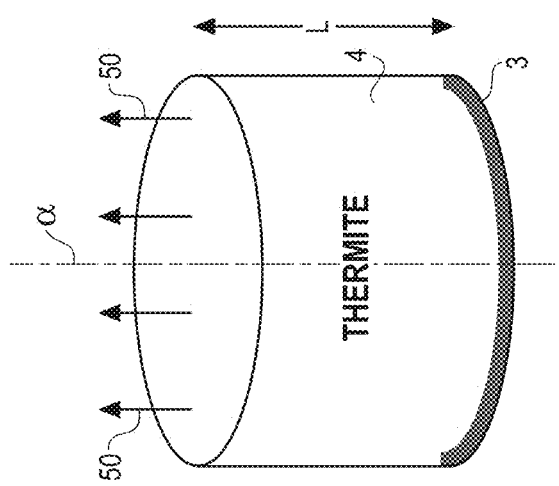
FIG. 4 is a schematic illustration of a thermite cylinder showing the direction of expansion along the axis of the cylinder when the ignition source is placed on the bottom of the thermite cylinder.

This degree of control in the direction of thermite expansion allows design of sections of the thermite charge in the form of a cylindrical plug that expand radially to fit tightly inside the well casing (using a linear ignition source on the centerline of the plug), while another section of the thermite charge could be ignited as shown in FIG. 4 to react in a planar direction and result in a longer plug.

An embodiment of this design could take the form of a modification of the thermite reaction charge of FIG. 3A in which the lower temperature layer 40 has an igniter positioned along the center axis of the layer 40 (in the manner shown in FIG. 5), such that when the lower temperature layer 40 is ignited the reaction proceeds in a radial direction so as to facilitate expansion of the thermite charge in the lower layer 40 against the casing 30 and swaging of the casing against the borehole wall 31 as shown in FIG. 3B at 32. The reaction of the thermite charge in the upper region of the lower layer 40 causes ignition of the upper layer 42. In this embodiment, the thermite charge in the lower temperature layer 40 is fitted with slippage/cleavage planes 60 as shown in FIG. 5 so as to facilitate the radial expansion of the thermite in the lower layer against the well casing and the performance of the swaging operation.

A second example of this embodiment would be to configure the thermite reaction charge 4 of FIG. 2A with an igniter 3 positioned along the central or vertical axis of the thermite charge 4 and providing slippage/cleavage planes in the thermite charge as shown in FIG. 5.

A third example of this embodiment is to configure the thermite charge of FIG. 1A with an axially located igniter 3 extending the entire length of the thermite charge 4 with slippage/cleavage planes 60 (FIG. 5) formed in the thermite charge 4.

A fourth example of the design of FIG. 5 would be to incorporate the centrally located igniter in the thermite charge 80 of FIG. 7A. In essence in this embodiment the thermite plug includes a first portion which has the axially located igniter to trigger radial expansion of the thermite material (FIG. 5), and a second portion which has an igniter designed to trigger planar expansion (FIG. 4).

In any of these embodiments, the thermite reaction charge which is ignited by the igniter may take the form of a thermite reaction charge diluted so as to reduce the exothermic reaction temperature and/or slow the reaction speed below what it would otherwise be without the addition of the diluents. For example the thermite reaction charge could take the form of a thermite reaction charge diluted by between 5 and 75% by mass with aluminum oxide, silica, calcium oxide, or other metal oxide.

To summarize, in this embodiment a thermite plug for a well is described which includes a thermite reaction charge formed as a generally cylindrical body of length L and a longitudinal axis α (FIG. 5); and an igniter 3 (FIG. 5) for the thermite material, wherein the igniter 4 is positioned axially and extending substantially the length L of the general cylindrical body along the longitudinal axis α to trigger an exothermic reaction in the thermite reaction material propagating substantially from the center of the cylindrical body outwardly in a radial direction.

The thermite plug preferably includes two or more slippage/cleavage planes 60 formed in the thermite reaction charge designed to promoting radial expansion of the thermite reaction charge during combustion. As shown in FIG. 7A and described below, the thermite plug could include a first section 80 having the thermite reaction charge and igniter 3 as recited above, and a second section 84 in the form of a second thermite material and a second igniter 3' disposed to trigger an exothermic reaction propagating substantially in the axial direction.

Another example, and perhaps a preferred example of this embodiment, is shown in FIGS. 7A-7D. This example features a relatively low temperature expansive thermite plug is used to support relatively hotter thermite charge above.

Thermite charges need to be supported in the well prior to ignition. This would normally be accomplished by installation of a bridge plug or platform (item 2 in FIGS. 1A, 2A, 3A, and 6A) or backfilling the well with cement or granular material prior to thermite charge emplacement.

To simplify the emplacement operation, the expansive nature of lower temperature thermite charges can be exploited to form a platform plug without the expense of backfill or bridge plugs. A lower temperature expansive plug, contained in an expandable metal cylinder (for example, a pleated thin-wall metal cylinder) is first set off below the main charge, allowed to cool to form a platform with adequate strength, then the main thermite charge is ignited above the platform.

This embodiment will now be described in conjunction with FIGS. 7A-7D. In this embodiment a plug for sealing a well includes a first thermite plug 80 having an igniter 3. The plug 80 includes a thermite reaction charge such as a mixture of aluminum and iron oxide. The plug 80 includes an upper surface 81. An insulating block 82 is provided having upper and lower surfaces, the lower surface of the insulating block is proximate to the upper surface 81 of the first thermite plug 80 as shown in FIG. 7A. A second thermite plug 84 is also provided having an igniter 3'. The second plug 84 includes a thermite reaction charge and a lower surface 85. The lower surface of the second plug 84 is positioned proximate to the upper surface of the insulating block 82. The thermite reaction charge in the first plug 80 may be diluted by between 5 and 75% by mass with a metal oxide, alumina, silica or the like.

The first plug 80 includes an expandable metal jacket 88 having pleats or folds which allow the plug 80 upon ignition to expand radially against the walls of the bore and provide a platform supporting the main charge in the second thermite plug 84. To facilitate this radial expansion, the igniter 3 for the first thermite plug is positioned within the plug 80 along the center axis (see FIG. 5).

The insulating block 82 is provided so as to enable the first plug 80 to be ignited, expanding the first plug 82 to expand against the walls of the bore (see FIG. 7B) and then cooled, while preventing ignition of the second or upper plug 84.

After the lower plug 80 has been ignited, combustion proceeds and then after completion the plug is allowed to cool, forming a lower plug 12 in FIG. 7C. Then, the igniter 3' for the upper or second plug 84 is activated and a thermite reaction occurs in the second plug 84. The second plug 84 melts the walls of the bore or formation 1 and forms a second, solid plug 12'. The first plug 12 acts as a bridge or support/platform for the second plug 84/12'.

Thus, in one embodiment of FIGS. 7A-7C the first thermite plug 80 includes a thermite reaction charge having a relatively cooler reaction temperature and wherein the second thermite plug 84 includes a thermite reaction charge having a relatively hotter reaction temperature. The igniter 3' for the second thermite plug 84 is positioned along the bottom surface of the second thermite plug. However, in an alternative configuration it would be possible to form the igniter for the second thermite plug 84 along the central axis (see FIG. 5), for example in the situation where it is desired to form a swage in a well having a well casing in accordance with the teachings of FIGS. 3A and 3B.

Another embodiment uses the expansive characteristics of the low temperature plug to confine, from above and below, the high temperature main thermite charge. In FIGS. 8A-8C three thermite charges are used. The lower plug 80 is a low temperature expanding plug and forms the structural platform for the assembly as previously described and shown in FIGS. 7A-7B. Simultaneously or shortly after the lower plug has reacted, the upper low temperature expanding charge 86 is ignited. Once the upper and lower plugs 86, 80 have completed their reactions, (see FIG. 8B) the middle higher temperature plug 84 is ignited and its reaction temperature and pressure confined to the zone between the upper and lower plugs. See FIG. 8C. Note that the upper and lower plugs 86, 80 both have a centrally placed igniter 3 as in the embodiment of FIG. 5. The upper plug 86 is separated from the middle plug 84 by means of an insulator 82.

It will be further appreciated that we have described in FIGS. 7A-7C a method for sealing a well, comprising the steps of: a) lowering into the well a plug comprising a first thermite plug 80 having a igniter 3, a thermite reaction charge and an upper surface; an insulating block 82 having upper and lower surfaces, the lower surface of the insulating block proximate to the upper surface of the first thermite plug, and a second thermite plug 84 having an igniter 3', a thermite reaction charge and a lower surface, wherein the lower surface of the second plug is positioned proximate to the upper surface of the insulating block; b) igniting the first thermite plug 80 so as to cause a thermite reaction in the first thermite plug, the first thermite plug expanding so as to form a plug in the well (FIG. 7B); and c) subsequently to step b) igniting the second thermite plug 84.

It will be further appreciated that we have described in FIGS. 8A-8C a method for sealing a well, comprising the steps of: a) lowering into the well a plug comprising a first thermite plug 80 having an igniter 3, a thermite reaction charge and an upper surface; an insulating block 82 having upper and lower surfaces, the lower surface of the insulating block proximate to the upper surface of the first thermite plug, a second thermite plug 84 having an igniter 3', and thermite reaction charge and a lower surface, wherein the lower surface of the second plug is positioned proximate to the upper surface of the insulating block, and a third thermite plug 86 having an igniter 3, a thermite reaction charge and an upper surface; a second insulating block 82 having upper and lower surfaces, the upper surface of the second insulating block proximate to the lower surface of the third thermite plug 86; b) igniting the first thermite plug 80 and third thermite plug 86 so as to cause a thermite reaction in the first and third thermite plugs, the first and third thermite plugs expanding so as to form plug in the well and confine the second plug (FIG. 8B); and c) subsequently to step b) igniting the second thermite plug 84.

In one possible variation, the thermite reaction charge in the first thermite plug (FIGS. 7A, 8A, item 80) takes the form of a thermite reaction material which has been diluted by one or more additives to moderate an exothermic reaction produced by the thermite material when ignited, i.e., to lower the reaction temperature and reaction velocity within the thermite material from what they would otherwise be without the one or more additives. As an example, the thermite reaction material in the first thermite plug has been diluted by an amount of between 5 and 75 percent by mass by addition of a metal oxide, silica, aluminum oxide, calcium oxide, etc. to the thermite reaction material. The third thermite plug 86 may also be diluted in a similar fashion.

It will further be understood that we have described a method for sealing a well, comprising the steps of: forming a platform in the well by means of ignition of a first thermite plug 80 lowered into the well (FIGS. 7A, 7B); and subsequently igniting a second thermite plug 84 at a position above the location of the platform (FIG. 7C). In one embodiment, the first thermite plug 80 is surrounded by an expandable metal package 88 (FIG. 7A). In this embodiment the first thermite plug 80 includes a thermite reaction material having a reaction temperature substantially less than the reaction temperature of the second thermite plug 84. Another embodiment (FIGS. 8A-8C) includes a third relatively low temperature expanding plug 86 on the top of the assembly, which is ignited simultaneously with the lowest plug 80 or shortly thereafter, forming a sealing plug to confine the subsequent reaction of the main high temperature plug 84.

Fourth Embodiment

Continuous Feed of Thermite Charge into Reaction Zone. (FIGS. 6A-6D)

A thermite charge package has to be smaller in diameter than the wellbore to allow insertion of the thermite charge to a desired depth. The compacted charge package also has a finite gas filled porosity since it cannot be pressed to its theoretical maximum density. The plug resulting from a thermite cylinder of a specific height will be shorter than its starting size by as much as 25% depending on the charge and product densities. This limits the amount of energy and material that can be placed in a defined or target plug zone within the well.

However, these drawbacks can be overcome by means of a tall cylinder of thermite which is placed in the plug zone and ignited from the bottom. The thermite charge will consume itself and continuously feed the thermite reaction charge in the cylinder into the combustion zone. Furthermore, if the thermite cylinder has been diluted such that the linear reaction rate is slower than the freefall velocity of the cylinder, the reaction will be confined to the bottom of the cylinder and not accelerate vertically up the bore of the well. This design, one embodiment shown in FIGS. 6A-6D, enables emplacement of large volumes of thermite material into a defined plug zone. In particular, with this design much more thermite material can be delivered to the plug zone than would be possible with a charge only as tall as the plug zone itself. Hence, this design produces large amounts of energy in a controlled fashion at the desired location in the well for forming a plug.

As a variation of this method, the thermite cylinder could be constructed in two or more layers, including a first relatively lower reaction temperature layer and a second relatively higher reaction temperature layer, in accordance with the design of FIG. 3A. This design would be suitable for example in the situation where the well bore includes a casing as show in FIG. 3A and one wishes to design a swage for the casing as shown in FIG. 3B and explained above.

With reference now to FIG. 6A, a thermite plug for a well is shown in the form of a thermite reaction charge 4 having a generally cylindrical body with length L, a longitudinal axis α (not shown, but see FIG. 5) and an upper end and a lower end 76, 78, respectively. An igniter 3 for the thermite reaction charge 4 is positioned proximate to the lower end 78 of the cylindrical body. The well has a target plug zone 70 having a longitudinal extent indicated by the bracket substantially less than the length L of the cylindrical thermite reaction charge 4, as shown in FIG. 6A. FIG. 6A shows the placement of the thermite plug 4 into the well by means of a wireline 5 or other suitable means. The well includes a plug or platform 2 below the target plug zone 70 on which the thermite reaction charge 4 rests.

FIG. 6B illustrates the ignition of the thermite reaction charge 4 by means of the igniter 3. The ignition of the charge results in a reaction or combustion zone 10. By means of gravity, and the consumption of the thermite material, the cylindrical charge 4 continuously feeds a thermite reaction material into the reaction zone 10. This is again illustrated in FIG. 6C, showing the progression of the reaction zone 10 upwards into the cylinder, or, equivalently, the continuous feed of thermite reaction material into the reaction zone. The expansion of the thermite charge melts the wall of the formation 1 as indicated at 14 and forms a plug in the well. As shown in FIG. 6D, the reaction has proceeded to completion by the burning of the thermite reaction charge at the upper surface of the cylinder 76. The resulting plug 12 completely fills the well and melts the surrounding formation 1 as indicated at 14 along the entire length of the target plug zone 70, forming a seal for the well.

An additional example of this embodiment is to load the charge 4 with a mass 22 as shown in FIG. 2A, providing additional downward force to the thermite charge 4 in the reaction zone 10 of FIG. 6C.

Accordingly, in one aspect of this embodiment, a method of sealing a well has been described comprising the steps of a) lowering a cylinder of thermite reaction charge (4) into a well proximate to a location where the well is to be plugged (FIG. 6A), b) igniting the thermite material, the ignited thermite material forming a reaction zone (FIG. 6B), and c) continuously supplying additional thermite reaction charge from the cylinder to the reaction zone after performing the ignition step (FIGS. 6C and 6D).

As shown in FIG. 6B, preferably the cylinder has an upper and a lower end, and wherein the igniting step b) comprises igniting the lower end of the cylinder.

Furthermore, in one preferred embodiment the thermite reaction charge 4 has been diluted by one or more additives to moderate an exothermic reaction produced by the thermite material when ignited, the moderating comprising lowering the reaction temperature and reaction velocity within the thermite material from what they would otherwise be without the one or more additives.

In one variation, the thermite reaction charge 4 could be formed as two or more layers including a first relatively lower reaction temperature layer and a second relatively higher reaction temperature layer in accordance with the teachings of the embodiment of FIGS. 3A and 3B.

Another variation is to use the continuous feed thermite plug 4 as the hot plug 42 as shown in FIG. 3A, to increase the amount of energy and material deposited in the plug zone.

Still further variations and modifications from the illustrated embodiments are of course possible within the confines of the present invention. All questions concerning the scope of the invention are to be answered by reference to the appended claims.

The invention claimed is:

1. A method of sealing a well, comprising the steps of:
    a) lowering a cylinder of reactants forming a thermite reaction charge into a well proximate to a target plug zone location where the well is to be plugged, the cylinder having a base and the cylinder being supported from below by a platform positioned in the well,
    b) igniting the thermite reaction charge at the base of the cylinder, the ignited thermite reaction charge forming a reaction zone, the reaction zone being a region at the base of the cylinder of reactants where an exothermic reaction occurs which consumes the thermite reaction charge, the exothermic reaction producing reactant products which fills the well at a target plug zone, and
    c) continuously supplying additional reactants as the thermite reaction charge feeds into the reaction zone under its own weight after performing the ignition step to thereby produce additional reactant products of the exothermic reaction which forms a plug sealing the well at the target plug zone.

2. The method of claim 1, wherein the reactants forming the thermite reaction charge has been diluted by one or more additives to moderate an exothermic reaction produced by the thermite reaction charge when ignited, the moderating comprising lowering the reaction temperature and reaction velocity within the thermite reaction charge from what they would otherwise be without the one or more additives.

3. The method of claim 2, wherein the thermite reaction charge has been diluted by between 5 and 75 percent by mass.

4. A method of sealing a well, comprising the steps of:
    a) forming a platform in the well below the target plug zone location by products of ignition of a first thermite reaction charge;
    b) lowering a cylinder of reactants forming a second thermite reaction charge into a well proximate to a target plug zone location where the well is to be plugged such that it rests on the platform;
    c) igniting the second thermite reaction charge at the base of the cylinder, the ignited thermite reaction charge forming a reaction zone at the base of the cylinder where an exothermic reaction occurs;
    d) continuously supplying additional reactants from the cylinder to the reaction zone after performing the ignition step, wherein the products of the reaction of the second thermite reaction charge form a plug in the well.

* * * * *